(12) United States Patent
Hegner

(10) Patent No.: US 6,578,427 B1
(45) Date of Patent: Jun. 17, 2003

(54) CAPACITIVE CERAMIC RELATIVE-PRESSURE SENSOR

(75) Inventor: Frank Hegner, Lörrach (DE)

(73) Assignee: ENVEC Mess- und Regeltechnik GmbH + Co., Weil am Rhein (DE)

( * ) Notice: Subject to any disclaimer, the term of this patent is extended or adjusted under 35 U.S.C. 154(b) by 0 days.

(21) Appl. No.: 09/592,127

(22) Filed: Jun. 12, 2000

Related U.S. Application Data

(60) Provisional application No. 60/165,835, filed on Nov. 16, 1999.

(30) Foreign Application Priority Data

Jun. 15, 1999 (EP) .............................. 99111580

(51) Int. Cl.$^7$ .............................. G01L 9/12
(52) U.S. Cl. ............................ 73/724; 73/718
(58) Field of Search ............... 73/718, 715, 724, 73/723

(56) References Cited

U.S. PATENT DOCUMENTS

| | | | | |
|---|---|---|---|---|
| 4,329,732 A | * | 5/1982 | Kavli et al. ................. | 361/283 |
| 4,458,537 A | * | 7/1984 | Bell et al. ................... | 73/718 |
| 5,001,595 A | * | 3/1991 | Dittrich et al. ............... | 361/283 |
| 5,005,421 A | * | 4/1991 | Hegner et al. ................ | 29/25.41 |
| 5,050,034 A | * | 9/1991 | Hegner et al. ................ | 177/210 C |
| 5,076,147 A | * | 12/1991 | Hegner et al. ................ | 73/715 |
| 5,155,653 A | * | 10/1992 | Kremidas ................... | 361/283 |
| 5,400,489 A | * | 3/1995 | Hegner et al. ................ | 73/718 |
| 5,656,780 A | * | 8/1997 | Park ........................ | 73/724 |
| 5,750,899 A | * | 5/1998 | Hegner et al. ................ | 73/706 |
| 5,836,063 A | * | 11/1998 | Hegner et al. ................ | 29/25.42 |
| 5,911,162 A | * | 6/1999 | Denner ..................... | 73/718 |

FOREIGN PATENT DOCUMENTS

EP   08189870   7/1996

* cited by examiner

Primary Examiner—Hezron Williams
Assistant Examiner—Lilybett Martir
(74) Attorney, Agent, or Firm—Bose McKinney & Evans LLP

(57) ABSTRACT

This relative-pressure sensors has virtually no zero offset at relative humidities up to near the saturation limit. The sensor has a diaphragm (11) having a surface on which a electrode (13) is deposited and a substrate (12) having a bore (23) for guiding reference air from af first surface to an opposite surface. The first surface is polished and provided with at least an addional electrode (15). The substrate and the diaphragm are soldered or brazed together along the periphery by means of a spacer (20) to form a chamber which is covered from inside with a thin layer (24) of hydrophobic material that is introduced through the bore after the soldering or brazing.

4 Claims, 2 Drawing Sheets

CAPACITIVE CERAMIC RELATIVE-PRESSURE SENSOR

This application claims the benefit of provisional application No. 60/165,835, filed Nov. 16, 1999.

FIELD OF THE INVENTION

This invention relates to capacitive relative-pressure sensors. With such sensors, pressures of media, such as liquids, gases, or vapors, can be measured, the measurement being made in relation to the current atmospheric or ambient pressure, which thus serves as a reference pressure.

BACKGROUND OF THE INVENTION

U.S. Pat. No. 5,079,953 discloses, as one of three variants, a capacitive ceramic relative-pressure sensor comprising
  a diaphragm
    having a surface on which a first electrode is deposited, and
  a substrate
    having a bore for guiding reference air from a first surface to an opposite, second surface,
      on which at least a second electrode is deposited,
    said substrate and said diaphragm being soldered or brazed together around the periphery by means of a spacer to form a chamber.

In such relative-pressure sensors, referred to herein as "pressure sensors" for simplicity, the so-called reference air from the atmospheric air, referred to herein as "ambient air", which, of course, is always more or less humid, flows through the bore in the substrate into the chamber.

By a suitable design of the housing for the pressure sensor, if the ambient air is saturated with humidity, the ambient air, before entering the chamber, can be caused to flow through or over a point having the temperature of its dew point, so that thereafter the temperature of the reference air will not pass below the dew point; this is accomplished by forcing the ambient air to pass a point of the housing whose temperature is equal to or less than that of the chamber in the sensor, so that the dew point of the ambient air is reached, i.e., condensation occurs, already at that point, and only reference air not saturated or oversaturated with humidity will reach the chamber. The relative humidity of the reference air may therefore be high, e.g., up to 95%.

Such a high relative humidity in the chamber of the pressure sensor causes the following problems, which are associated with the way in which capacitive ceramic pressure sensors are commonly manufactured.

Blanks for the diaphragm and substrate are so-called green compacts, which are preformed from a powdered ceramic starting material and a binder and subsequently sin-tered.

The starting ceramic material may be alumina, for example. The sintered alumina compacts of pressure sensors, i.e., the respective substrates and diaphragms of the sensors, generally have a purity of 96 wt. %. For special applications, however, the purity may be up to 99.9 wt. %. The sintered compacts have not only rough surfaces but also microcracks extending from these surfaces into the sintered compacts.

To produce a pressure sensor from a sintered diaphragm compact and a sintered substrate compact, the substrate and the diaphragm are soldered or brazed together along the periphery with the interposition of a spacer, so that the aforementioned chamber is formed. The solder or active brazing solder used represents the spacer. The solder is, for example, a glass frit, and the active brazing solder is, for example, an NiTiZr alloy in which the NiZr content is approximately equal to the NiZr eutectic, see U.S. Pat. No. 5,334,344. The soldering or brazing is also referred to as "joining".

Prior to the joining of the diaphragm and the substrate, electrodes are deposited on the surfaces that will face each other in the chamber after the joining. These electrodes are made of tantalum, for example, see U.S. Pat. No. 5,050,034, and are commonly deposited by sputtering. If the diaphragm and the substrate are joined using active brazing solder, the electrode or electrodes on the substrate must be located at a distance, i.e., be electrically isolated, from the joining material, since in the finished pressure sensor, the electrode of the diaphragm is electrically connected to the joining material.

The electrode or electrodes of the substrate must therefore be sputtered through a mask that is fixed directly on the surface of the substrate and covers that portion of the surface which has to be kept free of electrode material.

During the sputtering it is unavoidable, however, that due to so-called undersputtering, minute islands of electrode material, which are not in electrical contact with each other, are formed on the surface to be kept free of electrode material. Furthermore, as a result of the undersputtering, electrode material can penetrate into the above-mentioned microcracks.

Since water molecules of the reference air can both be adsorbed by the rough surface and penetrate into the microcracks, electrical connections are formed between the individual islands of electrode material, so that the area of the substrate electrode increases. This, however, results in a zero offset of the pressure sensor. This effect increases with increasing relative humidity of the reference air.

The problems described so far have hitherto been controlled relatively well by applying to the finished electrodes a spin-on glass layer of silicon dioxide, which actually serves to eliminate another problem, see U.S. Pat. No. 5,400,489. In this way, however, only relative humidities up to about 80% are controllable. Thus, at a relative humidity of 80%, related to 400° C., such pressure sensors have a zero offset of up to 1%. For high-accuracy measurements, this is not acceptable.

SUMMARY OF THE INVENTION

It is therefore an object of the invention to provide relative-pressure sensors that have virtually no zero offset at relative humidities up to near the saturation limit.

To attain this object, the invention provides a capacitive ceramic relative-pressure sensor comprising:
  a diaphragm
    having a surface on which a first electrode is deposited; and
  a substrate
    having a bore for guiding reference air from a first surface to an opposite, second surface,
    the first surface of the substrate being polished and provided with at least a second electrode,
  which substrate and which diaphragm are soldered or brazed together along the periphery by means of a spacer to form a chamber,
  which chamber is covered from inside with a thin layer of hydrophobic material that is introduced through the bore after the soldering or brazing.

In a preferred embodiment of the invention, the hydrophobic material is a silicone oil, a paraffin oil, or a silicone resin based on fluorinated siloxanes or on methyl polysiloxanes.

In another preferred embodiment of the invention, the substrate and the diaphragm are made of alumina ceramic.

One advantage of the relative-pressure sensors according to the invention is that they have a zero offset less than 0.2% even at a relative humidity of 95%, related to 400° C.

BRIEF DESCRIPTION OF THE DRAWINGS

The invention will become more apparent by reference to the following description of an embodiment taken in conjunction with the accompanying schematic drawings, which are not to scale to permit a better representation of details, and in which.

DETAILED DESCRIPTION OF EXEMPLARY EMBODIMENTS

Figure 1:
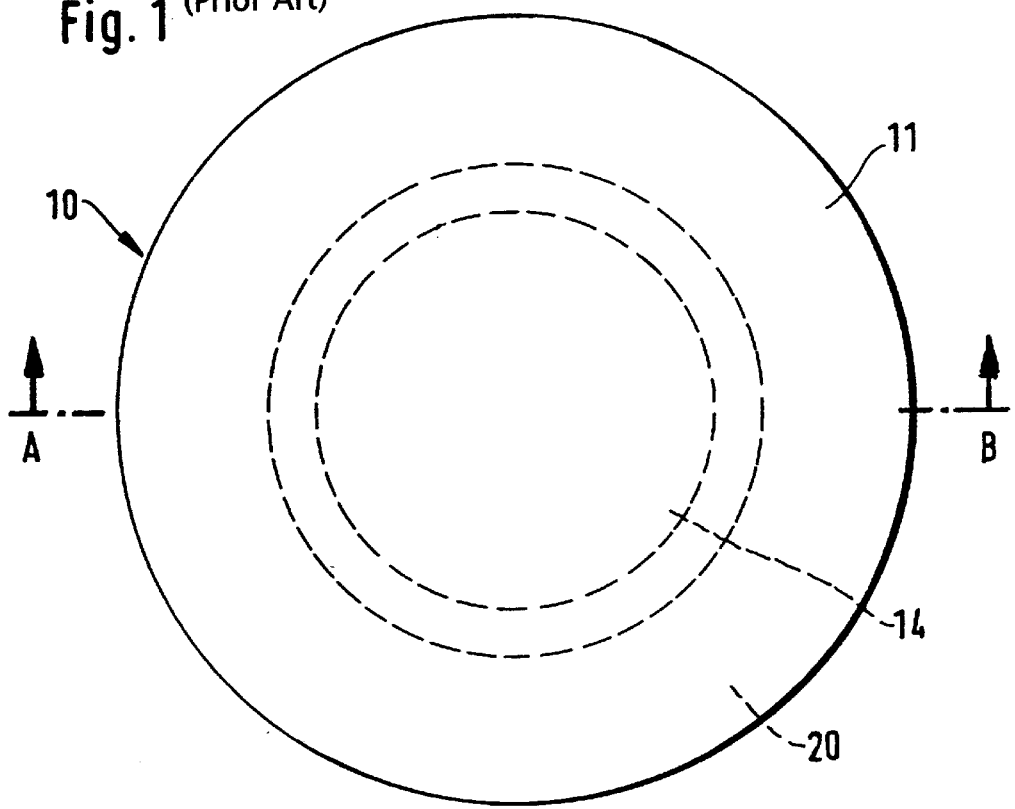
FIG. 1 is a top view of a pressure sensor.
Figure 2:
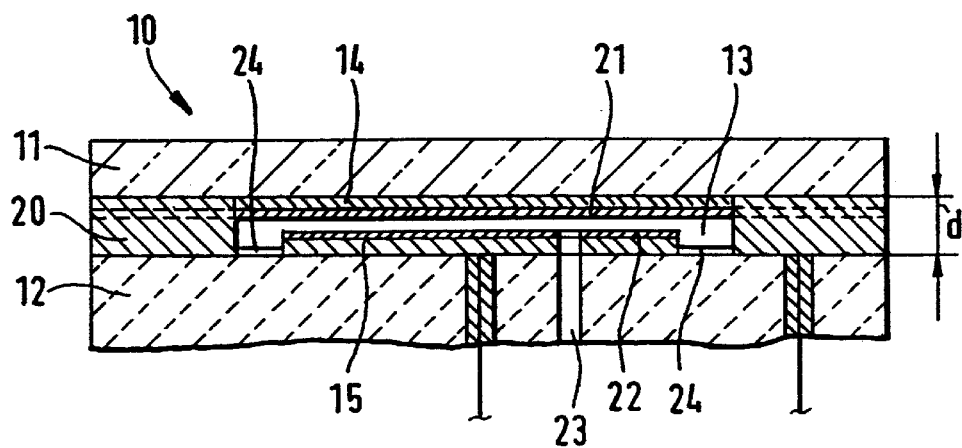
FIG. 2 is a section taken along line A-B of the pressure sensor of FIG. 1.

FIGS. 1 and 2 show a capacitive ceramic pressure sensor 10. The ceramic material is, for example, the above-mentioned alumina of 96 wt. % to 99.9 wt. % purity. The pressure sensor 10 has a diaphragm 11 in the form of a circular plate with parallel surfaces. Furthermore, the pressure sensor 10 comprises a substrate 12 which has the same shape as, but is thicker than, the diaphragm 11.

Diaphragm 11 and substrate 12 are brazed together along the periphery with the interposition of a spacer 20 holding them at a distance d from each other, as explained above. This is done in a high vacuum at a temperature of about 900° C. Because of the distance d, diaphragm 11 and substrate 12 form a chamber 13. The diaphragm 11 is thin and elastic, so that it can deflect and, thus, move back and forth when pressure is applied to it.

Facing surfaces of diaphragm 11 and substrate 12 are provided with electrodes 14 and 15, respectively, which are preferably made of tantalum and whose facing surfaces are covered by protective tantalum dioxide layers 21 and 22, respectively, as is described in the above-mentioned U.S. Pat. No. 5,050,034. Instead of a single electrode 15, two or more electrodes may be provided on the substrate 12.

Prior to the deposition of the electrode 15, the surface of the substrate 12, in addition to being ground or lapped as usual, was polished in order to further reduce the roughness still present after the grinding or lapping; this polishing is a first step toward the attainment of the object of the invention, preferably, the surface is polished to a roughness less than 0.05 $\mu$m. Through this polishing, the above-mentioned disadvantageous adsorptive capacity of the surface is greatly reduced.

The electrode 14 covers the diaphragm 11 completely and thus combines with the spacer 20 of active brazing solder during the joining process. By contrast, the electrode 15 of the substrate 11 is deposited in such a way as not to be electrically connected with the spacer 20. The electrodes 14, 15 are deposited by the above-mentioned sputtering; in the case of the electrode 15 of the substrate 12, the sputtering is performed through the above-explained mask.

The substrate 12 is provided with a bore 23, which was formed already in the green-compact phase, for example. The bore extends through the electrode 15, since the chamber-side opening is not closed by the sputtering the electrode 15. Thus, the chamber 13 is not closed but communicates with the outside, which is a basic requirement of a relative-pressure sensor.

As the above-mentioned undersputtering cannot be avoided even if the surface of the substrate 12 was polished, the chamber 13 of each joined pressure sensor 10 is covered from inside with a thin layer 24 of hydrophobic material, which is introduced through the bore 23. For the sake of clarity, the layer 24 is shown in FIG. 2 only at the surface of the substrate 12 not covered by the electrode 15. The layer 24 covers all inner surfaces of the chamber 13.

Through the hydrophobic layer 24, not only the islands of electrode material resulting from the undersputtering as explained above, but also the surface portions of the substrate 12 between these islands, i.e., the portions with the roughness left after the polishing and with the microcracks, are passivated against any adsorption of water. Thus, the above-mentioned increase in the area of the substrate electrode is virtually impossible, as is shown by the measured values given above in connection with the advantages.

Figure 3:
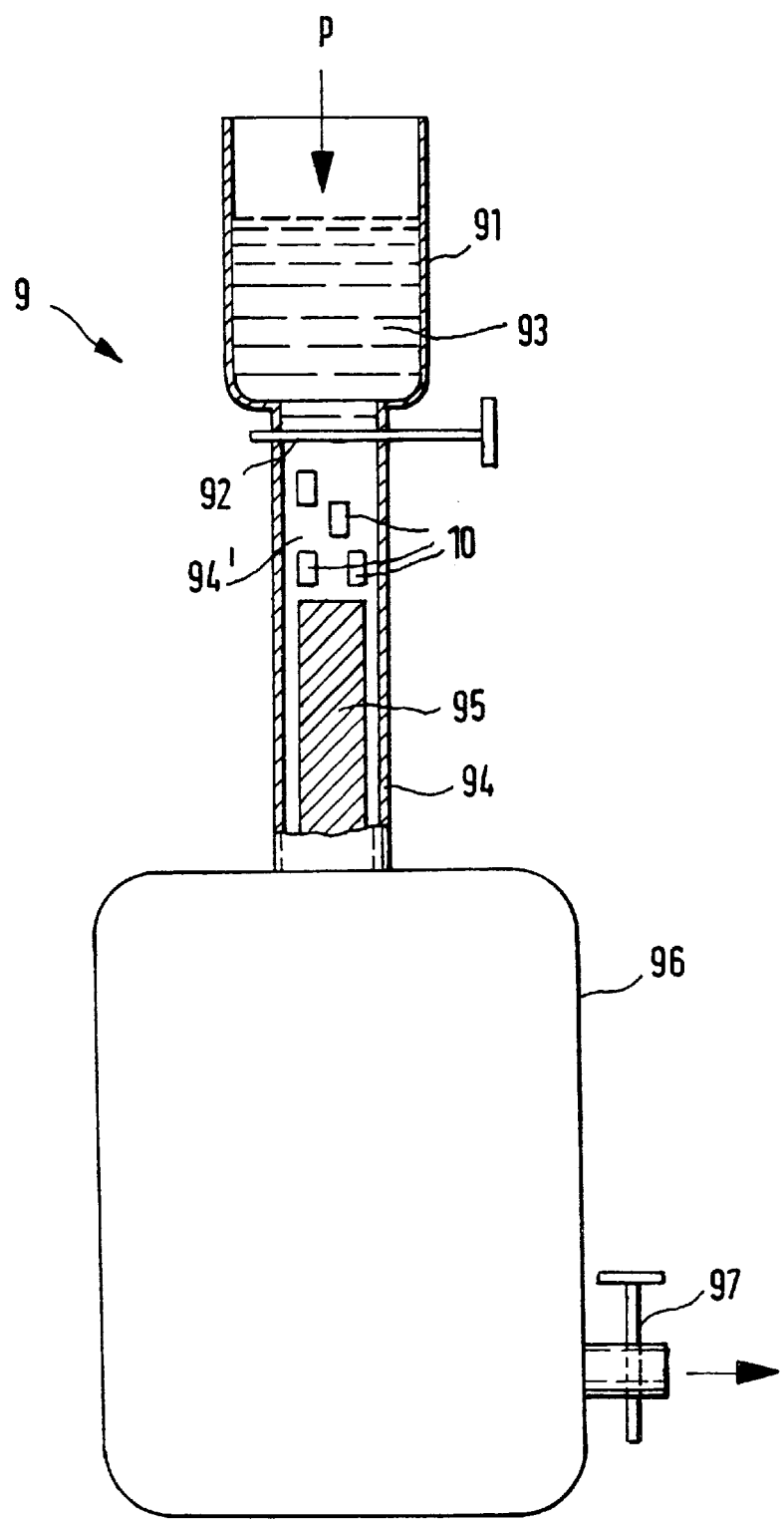
FIG. 3 shows schematically a coating facility in which the chambers of the pressure sensors are made hydrophobic.

FIG. 3 shows schematically a coating facility 9 in which the chambers 13 of the pressure sensors 10 are made hydrophobic. Prior to this step, cleaning is not necessary, since the surfaces of the pressure sensors are extremely clean following the above-mentioned high-vacuum sintering and joining process; this is an ideal precondition for good adhesion of the hydrophobic layer 24.

The clean pressure sensors 10 are put into the coating facility 9. The latter comprises a liquid container 91 which is open to the atmosphere and has a valve 92 at its bottom side. The atmospheric pressure p can thus act on the liquid 93 in the container 91.

The liquid 93 is highly wetting and contains an impregnant, such as silicone oil, paraffin oil, or a fluorinated-siloxane-based or methyl-polysiloxane-based silicone resin, highly diluted with a solvent having a high vapor pressure. Preferably, the impregnant and the solvent are mixed in a ratio between 1:20 and 1:100. A 1% solution of a methylpolysiloxane resin in hexane has proved particularly effective.

Below the valve 92, the clean pressure sensors 10 are contained in a pressure-sensor-receiving space 94' of a tube 94 above a flow bottleneck 95 for the liquid 93. The tube 94 ends in a collecting tank 96 for the liquid 93, which is connected via a second valve 97 to a vacuum pump (indicated by an arrow.)

After the pressure sensors have been filled in, the valve 92 is closed, the valve 97 is opened, and the vacuum pump is switched on, so that the air in the chambers 13 of the pressure sensors 10 is removed. After this evacuation, the valve 97 is closed and the valve 92 opened.

As a result, under the action of the atmospheric pressure p, the liquid 93, i.e., impregnant plus solvent, flows into the pressure-sensor-receiving space 94' and penetrates into the chambers 13 of the pressure sensors 10. After the entire amount of impregnant plus solvent filled into the liquid container 91 has run into the pressure-sensor-receiving space 94', the valve 97 is opened. The resulting atmospheric pressure in the pressure-sensor-receiving space 94' presses the chambers 13 of the pressure sensors 10 full of impregnant plus solvent.

The impregnated pressure sensors 10 are then removed and left at room temperature, i.e., at about 20° C., preferably for about two hours, or placed in a second vacuum chamber, preferably for about 5 min. After that, the solvent has evaporated. The pressure sensors are then heated, preferably to about 200° C., whereby the impregnant is burnt into the surfaces bounding the chambers, so that these surfaces become hydrophobic.

While the invention has been illustrated and described in detail in the drawing and foregoing description, such illustration and description is to be considered as exemplary and not restrictive in character; it being understood that only exemplary embodiments have been shown and described and all changes and modifications that come within the spirit of the invention are desired to be protected.

I claim:

1. A capacitive ceramic relative-pressure sensor comprising:
 a diaphragm
  having a surface on which a first electrode is deposited; and
 a substrate
  having a bore for guiding reference air from a first surface to an opposite, second surface,
  the first surface of the substrate being polished and provided with at least a second electrode,
  which substrate and which diaphragm are soldered or brazed together along the periphery by means of a spacer to form a chamber,
 which chamber is covered from inside with a thin layer of hydrophobic material that is introduced through the bore after the soldering or brazing.

2. The pressure sensor as claimed in claim 1 wherein the hydrophobic material is a silicone oil, a paraffin oil, or a silicone resin based on fluorinated siloxanes or on methylpolysiloxanes.

3. The pressure sensor as claim in claim 1 wherein the substrate and the diaphragm are made of alumina ceramic.

4. The pressure sensor as claim in claim 2 wherein the substrate and the diaphragm are made of alumina ceramic.

* * * * *

UNITED STATES PATENT AND TRADEMARK OFFICE
CERTIFICATE OF CORRECTION

PATENT NO.    : 6,578,427 B1
DATED         : June 17, 2003
INVENTOR(S)   : Frank Hegner It is certified that error appears in the above-identified patent and that said Letters Patent is hereby corrected as shown below:

<u>Title page,</u>
Item [30], please correct the following foreign cited reference in the FOREIGN PATENT DOCUMENT section of the bibliography page:

-- JP          08189870       7/1996 --

Signed and Sealed this

Twenty-first Day of October, 2003

JAMES E. ROGAN
*Director of the United States Patent and Trademark Office*